United States Patent [19]

Lind et al.

[11] Patent Number: 5,181,041
[45] Date of Patent: Jan. 19, 1993

[54] ACCURATE LOCATION SYSTEM USING TRANSPONDED AND CORRELATED LORAN SIGNALS

[75] Inventors: Harold V. Lind, Sun City West, Ariz.; Walter R. Fried; Jacob L. Bricker, both of Santa Ana, Calif.

[73] Assignee: Hughes Aircraft Company, Los Angeles, Calif.

[21] Appl. No.: 724,694

[22] Filed: Jul. 2, 1991

[51] Int. Cl.$^5$ ............................................. G01S 3/02
[52] U.S. Cl. ........................................ 342/453; 342/389
[58] Field of Search ............................. 342/389, 453

[56] References Cited

U.S. PATENT DOCUMENTS

| | | | |
|---|---|---|---|
| 3,881,096 | 4/1975 | Schmidt | 342/387 |
| 3,987,445 | 10/1976 | Fales, III | 342/353 |
| 4,024,383 | 5/1977 | Beasley | 342/396 |
| 4,191,958 | 3/1980 | Hulland et al. | 342/396 |
| 4,882,590 | 11/1989 | Huss et al. | 342/453 |

*Primary Examiner*—Theodore M. Blum
*Attorney, Agent, or Firm*—Wanda K. Denson-Low

[57] ABSTRACT

An accurate location system 10 for use in locating the position of a tracked unit 16 having at least a first and a second transmitter 14, 22 for propagating at least first and second signals and a master station 12 for receiving and storing the first and second signals, respectively. The tracked unit 16 receives and operates on the first and second signals from the first and second transmitters 14, 22, respectively, for providing third and fourth signals which are transponded to the master station 12. A correlation detector 40 located within the master station 12 receives and cross-correlates the transponded third and fourth signals with the stored first and second signals within the master station for determining the additional times of flight ($\tau$) of the third and fourth signals transponded to the master station. The locus of points of constant ($\tau$) form an ellipse associated with each of the first and second signals with one of a plurality of intersections of the ellipses defining the position of the tracked unit 16. Thus, the invention provides a position location arrangement which receives and cross-correlates the direct and transponded signals to the master station to permit precisely locating the tracked unit by elliptical geometric methods.

11 Claims, 4 Drawing Sheets

ACCURATE LOCATION SYSTEM USING TRANSPONDED AND CORRELATED LORAN SIGNALS

BACKGROUND OF THE INVENTION

1. Field of the Invention

The present invention relates to position tracking systems. More specifically, the present invention relates to methods and apparatus for using LORAN-C signals for locating tracked units in a localized area in two dimensions.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In the field of position location and tracking systems, a need has long existed in the art for a system capable of accurately locating units in urban and marine areas in an economical manner. In particular, conventional LORAN based position tracking systems generally provide only moderate accuracy. Further, such position tracking systems do not accurately track units, such as emergency vehicles, in electrically noisy environments. Conventional LORAN systems are degraded in noisy environments since such conventional systems are designed primarily for use in low noise navigation systems. Therefore, the precision available from conventional position tracking systems has been limited.

Generally, conventional LORAN systems operate by measuring the difference in time of arrival of signals from two or more LORAN stations. LORAN stations are often 500-to-700 miles from a unit being tracked, such as a ship. If a ship is entering a harbor, conventional LORAN is often not sufficiently accurate, in short distance measurements, to determine the position of the ship. This is due to uncertainty in the electrical distance from the LORAN stations to the tracked unit. Thus, accuracy in LORAN-C systems continues to be a problem.

In conventional LORAN systems, the receiver located on the tracked unit, calculates the location of the tracked unit. This is accomplished by causing the receiver to process the signals propagated by several LORAN transmitters and by determining a time difference of arrival ($\delta t$) between the several signals. The time differences ($\delta t$) are then mathematically manipulated to provide a position which represents an intersection of two hyperbolas which indicates the location of the tracked unit.

Generally, position tracking systems, heretofore designed for the intelligence gathering art, were too expensive for commercial and military training applications. Other approaches, such as that of the Vehicle Locating System (VLS), require a significant initial investment to emplace either satellite or terrestrial repeater stations. For example, the Geostar LINK ONE system, among others, has utilized vehicular LORAN-C receivers in each tracked unit for determining the unit's position. Thereafter, the computed position is datalinked from the tracked unit back to a central station. Such a system requires a LORAN-C processor in every unit. Since signal processing is required at the receiving station located at each of the tracked units, the equipment costs at each of the units is high. Further, since the LORAN transmitting station is potentially hundreds of miles away, significant errors (as much as five-hundred meters) are often encountered. Additionally, it is well known that the signal-to-man-made noise ratio in urban areas is weak, further decreasing accuracy.

Another method of interest is one employed in the art of meteorology. In that technique, a 100 KHz signal transmitted by a LORAN-C transmitter is received by a tracked unit, in this case a weather balloon incorporating a receiver RF amplifier. The receiver RF amplifier receives the 100 KHz signal from the LORAN-C transmitter and transponds the signals to an Ultra High Frequency (UHF) carrier signal for broadcast to a central ground station. There, the frequency of the signal is reconverted back to 100 KHz wherein the reconverted signal is delivered to a LORAN-C receiver.

The function of the weather balloon incorporating the receiver RF amplifier is to collect and process meteorological data such as temperature, pressure, wind speed, humidity and the like. Further, the position of the weather balloon is of significance and thus the receiver mounted on the balloon can receive multiple LORAN signals and transpond each of the signals to the ground station. Upon receipt, a calculation involving the time difference of reception is performed on the signals which determines the location of the balloon. It is noted that such a system operates in the manner of a conventional LORAN system. There is no attempt to receive the LORAN signal directly at the meteorological ground station.

Using the above-described techniques, an accuracy of only 200-300 meters could be achieved which is far below what is desirable for training ranges and emergency vehicle locators. It has been known for a shore based receiver station to monitor the same transmitted LORAN-C signals as those monitored by ships in the harbor. Under these circumstances, any measured differences from the known position of the shore based station were broadcast to the ships and other users of the position information. When corrections were introduced, the accuracy of the position tracking system was improved to a range of from ten to fifteen meters. However, this was an ideal situation positioned over water which is characterized by a lower electrical noise environment than that exhibited by an urban environment. Thus, the results reached in this ideal situation would not likely be repeated in the electrically noisy urban environment.

Additionally, in the traditional position tracking systems employing LORAN-C signals, generated time measurements were not based relative to the position of a local base station. Thus, inaccuracies resulted from attendant propagation anomalies.

Finally, existing prior art receiver systems failed to make full use of all the energy in the received LORAN-C signal.

Thus, there is a need in the art for an improvement in position tracking systems that utilize LORAN-C signals which provides higher precision in locating units by making time measurements relative to a local base station. In addition, there is a need for a system which provides improved system sensitivity, permits the tracking system to avoid traditional inaccuracies caused by propagation anomalies, and permits operation in an electrically noisy environment so that emergency units can be successfully tracked. Ideally, the system would allow for optimum use of the transponded signal energy by employing correlation detection of the transponded signal. The system should provide a more efficient system than prior systems and operate more economically.

SUMMARY OF THE INVENTION

The need in the art is addressed by the position location system of the present invention. In general, the invention is effective to locate a tracked unit and includes first and second transmitters for propagating first and second signals. A master station is included for receiving and storing the first and second signals. The tracked unit is equipped to receive and operate on the first and second signals to provide third and fourth signals. The third and fourth signals are transponded to the master station. A correlation detector at the master station receives and cross-correlates the transponded third and fourth signals with the stored first and second signals to determine the additional times of flight ($\tau$) of the third and fourth signals transponded to the master station. The locus of points of constant ($\tau$) form an ellipse associated with each of the first and second signals with one of a plurality of intersections of the ellipses defining the position of the tracked unit.

The invention provides a position location arrangement which receives and cross-correlates the direct and transponded signals to the master station to permit precise location of the tracked unit by elliptical geometric methods.

DESCRIPTION OF THE INVENTION

As shown in the drawings for purposes of illustration, the invention is embodied in an accurate location system 10 of the type having a central master station 12 receiving signals from a LORAN-C transmitter 14, the master station 12 and the transmitter 14 each being of known location, and a tracked unit 16 of unknown location having a localized position with respect to the master station 12 and also receiving signals from the LORAN-C transmitter 14, the combination of received signals being utilized for determining the position of tracked unit 16 by cross correlation methods.

Conventional LORAN systems generally operate by measuring the difference in time of arrival of signals from two of more LORAN stations which are often several hundred miles from a tracked unit. In the case where a tracked unit such as a ship is entering a harbor, conventional LORAN is not sufficiently accurate for short distance measurements for determining the position of the ship. This fact is due to the uncertainty of the distance that the electrical signal must travel from the LORAN station to the tracked unit. Further, various conditions such as the weather and the terrain, tend to distort the signal during transmission. Therefore, precision in LORAN-C systems is a major problem.

In conventional LORAN systems, the receiver located on the tracked unit calculates its own approximate location. This is accomplished by receiving the signals propagated by several LORAN transmitters and determining a time difference of arrival ($\delta t$) between the several signals. The time differences ($\delta t$) are then mathematically manipulated to provide a position which represents an intersection of two hyperbolas which indicates the location of the tracked unit.

Figure 1:
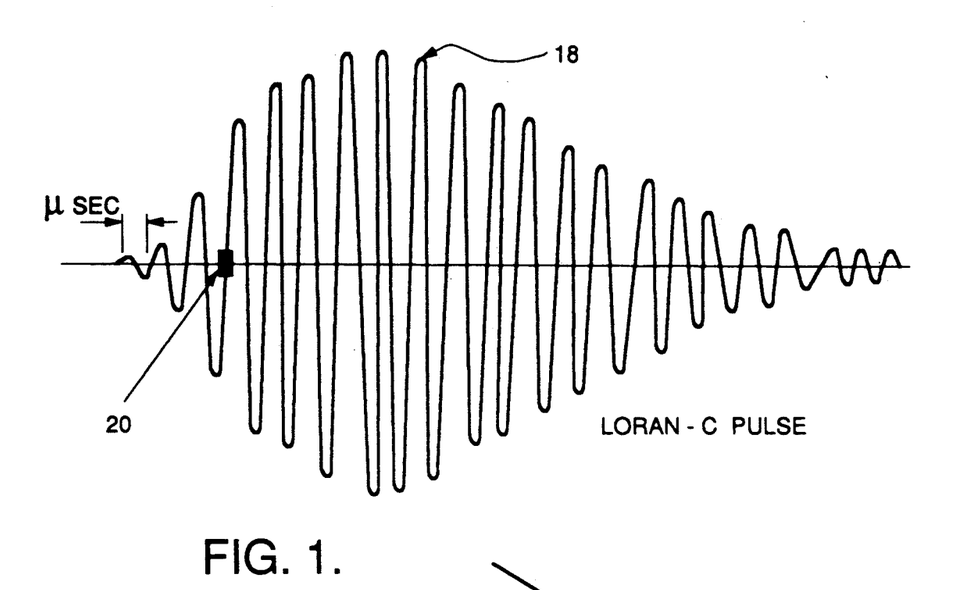
FIG. 1 is a graph of the known structure of a single LORAN-C pulse transmitted by LORAN stations and intercepted by an accurate location system in accordance with the present invention.

The structure of a single LORAN-C pulse 18 is shown in FIG. 1. In order to establish a time reference in the standard LORAN-C pulse, the LORAN-C system attempts to detect the third positive-going zero crossing 20 on the carrier pulse. The third positive-going zero crossing 20 becomes a standard sampling point and it is noted that this sampling point appears early in the signal. Thus, only a limited fraction of the signal energy is sampled and used by the LORAN-C receivers. The remainder of the LORAN-C signal energy is unused. It is fundamental that the more energy of a particular signal that is used to make a measurement, the more accurate the measurement will be. Since the signal is measured early in the LORAN-C pulse, the accuracy of the sample is less than that which is optimally achievable.

Figure 2:
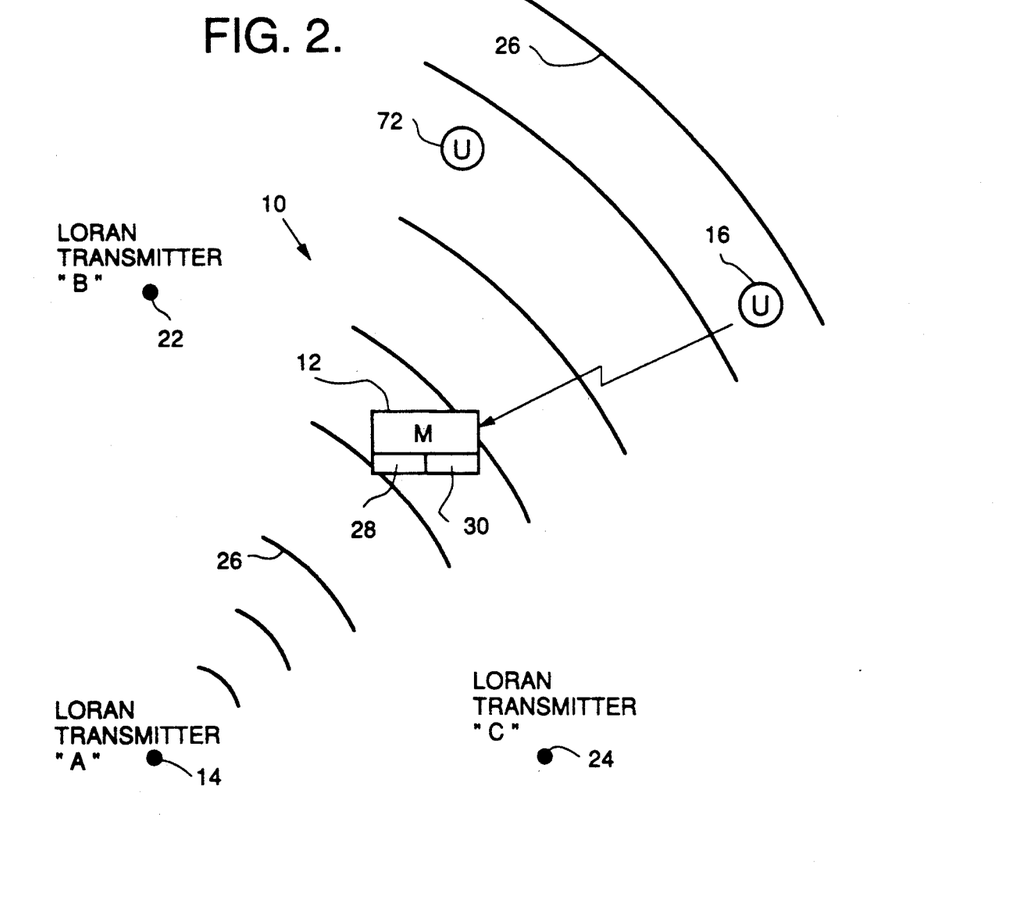
FIG. 2 is a diagram illustrating the arrangement of the components in the accurate location system in accordance with the present invention utilizing transponded and correlated differential LORAN signals.

The accurate location system of the present invention 10 is based upon the synergistic effects of the combination of two techniques comprising: transponded differential LORAN-C with the process of correlation detection and relative position location in an elliptical, rather than a hyperbolic, coordinate system. This combination has the potential of improving the position accuracy to within fifteen meters and allowing operation within electrical noisy regions. An illustrative set of LORAN-C transmitters designated 14, 22 and 24 are shown in FIG. 2. Also shown is the central master station "M" identified by the numeral 12, and the tracked unit "U" designated by the numeral 16.

The accurate location system 10 uses the time difference of arrival ($\delta t$) of a signal traveling by two different paths to determine the additional time of flight ($\tau$) between the two paths. One path is from the LORAN-C transmitter 14 direct to the master station 12 while the other path is indirect to the master station 12 via the tracked unit 16. The location of the tracked unit 16 is to be determined. In two dimensions, the time difference of arrival places the location of the tracked unit 16 on an ellipse. The use of two LORAN-C transmitters 14, 24 reduces the possible locations of the tracked unit 16 to one or more points where the ellipses intersect. Additional LORAN-C transmitters or other means are used to eliminate spurious location points.

In general, the central master station 12 and the tracked unit 16 each receive a plurality of LORAN-C signals 26 from the transmitters 14, 22 and 24. Thereafter, the tracked unit 16 transponds the plurality of received signals to the master station 12. At the master station, two LORAN receivers 28, 30 are in operation with one of the receivers 28 responding to the direct LORAN-C signals 26 from transmitters 14, 22 and 24 while the other receiver 30 responds to the plurality of transponded LORAN-C signals 32 via the tracked unit 16 (see FIG. 3). The approximate location of the tracked unit can then be defined by conventional differential LORAN techniques using receiver 30.

One of the advantages of the present invention is that tracked unit location accuracy is improved by more efficient use of the received LORAN-C signals. The central master station 12 receives a clean version of the LORAN-C signals from the transmitters 14, 22 and 24 by employing a quality, low frequency antenna system (not shown). In standard LORAN-C receivers, time is defined at the third positive-going zero crossing 20 of the carrier pulse as shown in FIG. 1. In electrical noisy locations, it is difficult to determine the pulse envelope shape and to establish which zero crossing is the third since it is still at low amplitude on the rise of the pulse. This early sampling is used to avoid possible skywave distortion arriving later in the pulse but it also means that all of the energy after the sampling point is wasted with regard to measuring time.

If the LORAN-C signal is received at the tracked unit 16 along path R2, then transponded to the central master station 12 along a path R3, and thereafter multiplied by the clean version of the LORAN-C signals stored at the master station (for various time delays), this optimum detection process makes use of all the energy in the LORAN-C signal. This process is considered to be correlation or convolution. It is noted that the correlation function of a 100 KHz sine wave is clearly repetitive but with a wavelength of 3000 meters, the proper cycle can be determined. This type of processing can be used even if there is distortion in the signal as long as the same distortion appears at the central master station 12 and the tracked unit 16 within the local area.

In operation, both the master station 12 and the tracked unit 16 receive LORAN-C signals 26 directly from the transmitters 14, 22 and 24. The LORAN-C signals 26 received at the tracked unit 16 are thereafter transponded to the master station 12 by a conventional transponder and convolved with the signals 26 received directly from the transmitters. For the purposes of clarity, assume that the internal delay of the transponder is zero or is a known constant which can be removed. A LORAN-C signal 26 is shown being intercepted by the master station 12 in FIG. 3 with a corresponding signal 26 being intercepted by the tracked unit 16. The signals 26 intercepted by the master station 12 along the path R1 are digitally stored while the signals 26 intercepted by the tracked unit 16 are transponded to the master station 12.

The transponded signals 32 received at the master station 12 from the tracked unit 16 along path R3 can be retransmitted by any suitable means. The transponded signals 32 are operated upon, e.g., are retransmitted but are not processed by the tracked unit 16. For every LORAN-C signal 26 received at the tracked unit 16, a corresponding transponded signal 32 is retransmitted to the master station 12. Thus, if two LORAN-C transmitters 14, 22 each propagate a signal 26 and the two signals 26 are thereafter received at the tracked unit 16, two corresponding transponded signals 32 are each retransmitted to the master station 12.

The master station directly receives a LORAN-C signal 26 from each of the transmitters 14, 22 and 24 in addition to the plurality of transponded LORAN-C signals received along the path R3 from the tracked unit 16. The master station 12 can recognize which signals 26 are from transmitters 14, 22 and 24 and which signals 32 are transponded from the tracked unit 16. The master station 12 convolves the data to remove any error or delay 36 in transmission of the LORAN-C signals 26 from the transmitters to the master station 12 and to the tracked unit 16. The removal of such errors and delays is possible since the positions of the master station 12 and the transmitters 14, 22 and 24 are known. Thereafter, the position of the tracked unit 16 is geometrically determined to be located on an ellipse of constant time difference shown in FIGS. 3 and 4. The presence of the master station 12 in the present invention serves as a fifth station for correlating two sets of signals.

Figure 4:
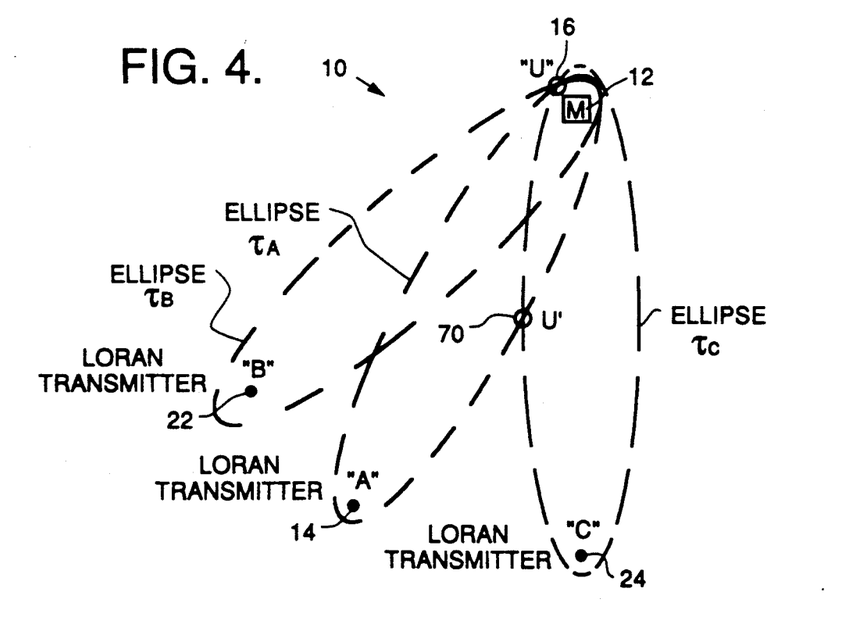
FIG. 4 is a more detailed diagram illustrating the procedure for locating a tracked unit in the accurate location system of FIG. 2 showing the intersection of three ellipses of constant $\tau$ and illustrating the procedure for identifying the location of the tracked unit.

Mathematical manipulations of the signals 26, 32 determines the position of the tracked unit 16 which is represented by the intersection of at least two ellipses as shown in FIG. 4. Correlation detection is a mathematical function and cross correlation of the direct and transponded signals 26, 32, respectively, at the master station 12 provides the maximum utilization of the received signal energy. Additionally, cross correlation provides determination of the additional times of flight ($\tau$) required for the transponded signals 32 to reach the master station via the tracked unit 16. The time difference is used for determining upon which ellipse the tracked unit 16 lies. Each additional time of flight measurement ($\tau$) is uniquely associated with and defines one particular ellipse. Further, as the additional time of flight measurement ($\tau$) increases, the ellipse becomes larger.

Figure 5:
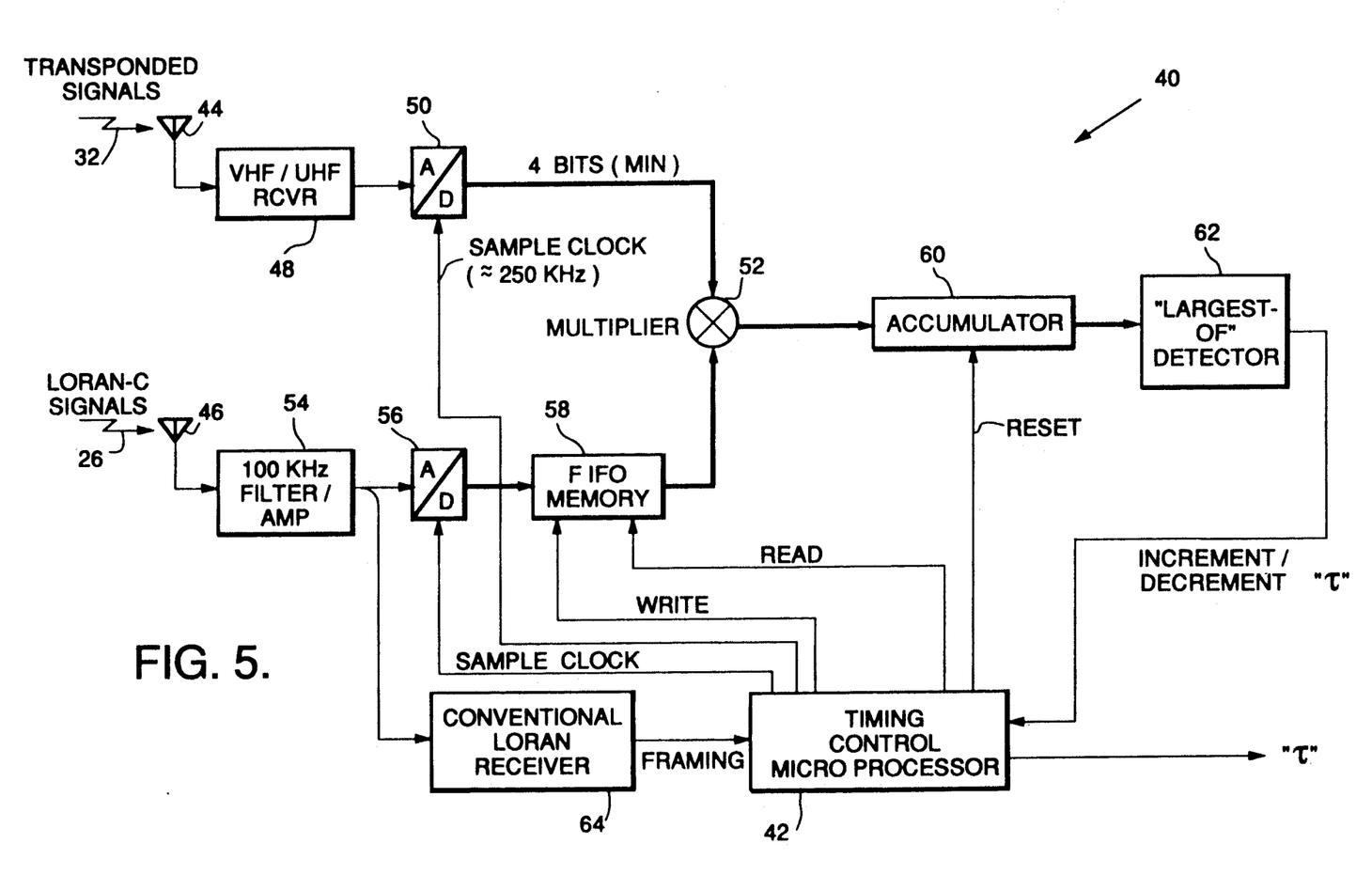
FIG. 5 is a block diagram illustrating the arrangement of the components in a correlation detection device located in the master station shown in FIGS. 3 and 4.

As a practical matter, correlation detection is accomplished in hardware or in software. An example of such hardware structure is shown in FIG. 5 which is a block diagram of a portion of the master station 12 which receives and correlates the LORAN-C signals 26 and the transponded signals 32. In particular, FIG. 5 shows the main components of a correlation detection device 40 located in the master station 12 shown in FIG. 3. The actual process of cross correlation is accomplished by employing a timing control microprocessor 42 which, in this example, can be a family of logic circuits having memory and processing capability. Generally, microprocessors require some form of extended memory external to the microprocessor to store the system program and large amounts of data. The microprocessor 42 is located within the correlation detection device 40 as shown in FIG. 5.

Each of the LORAN-C transmitters 14, 22 and 24 propagate the signal 26 directly to the master station 12 and the tracked unit 16 at a frequency of 100 KHz. The 100 KHz signal 26 received at the tracked unit 16 is transponded or retransmitted to the master station 12 at a VHF or UHF frequency, for example, 400 MHz. Thus, signals of the two frequencies of 100 KHz and 400 MHz are each directed toward the master station 12 which includes a pair of antennas 44, 46 for receiving the respective signals. Each of the signals 26, 32 impinge upon both antennas 44, 46 with the transponded signals 32 being received on antenna 44, demodulated to the original frequency of 100 KHz, and digitized in a first path while the direct signals 26 are received on antenna 46, filtered, amplified and digitized for processing on a second path.

The combination of antenna 44 and a VHF/UHF receiver 48 is tuned to receive and process the 400 MHz transponded signal 32 from the tracked unit 16. However, the original 100 KHz LORAN-C signal 26 is prevented from passing the receiver 48 in the first path by conventional methods. The transponded signal 32 is then demodulated and converted back to the original 100 KHz frequency by the receiver 48. The output signal of the receiver 48 is directed to a first analog-to-digital (A/D) converter 50 which digitizes the transponded (analog) signal 32 providing a first digital signal in the first path. The first digital signal includes a minimum of four bits for providing a good representation of the analog signal. The operation of the A/D converter 50 is controlled by a 250 KHz sample clock pulse transmitted to the converter 50 from the timing control microprocessor 42. Thereafter, the first digital signal is transmitted to a multiplier 52 which is disclosed in more detail hereinbelow.

The combination of antenna 46 and a 100 KHz filter/amplifier 54 is tuned to receive and operate on the original 100 KHz LORAN-C signal 26 from the LORAN-C transmitters 14, 22, 24. Note that the 400 MHz transponded signal 32 is blocked by the input impedance of filter/amplifier 54 in the second path. The amplifier portion of the filter/amplifier 54 has a center frequency of 100 KHz. After filtering, the signal 26 is amplified and directed to a second analog-to-digital (A/D) converter 56. The A/D converter 56 digitizes the 100 KHz (analog) signal 26 for providing a second digital signal in the second path. As before, the second digital signal includes a minimum of four bits. The operation of the A/D converter 56 is controlled by a 250 KHz sample clock pulse transmitted to the converter 56 from the timing control microprocessor 42.

It is emphasized that the LORAN-C signals 26 propagated from the transmitters 14, 22 and 24 directly to the master station 12 are received at the master station before the transponded signals 32 are received at the master station 12 from the tracked unit 16. This time delay in receipt of the transponded signals 32 with respect to the direct LORAN-C signals 26 is defined as the additional time of flight ($\tau$). A main advantage of the present invention is that the correlation detection device 40 permits the determination of the additional time of flight ($\tau$) of the transponded signals 32. With this information, the position of the tracked unit 16 can be determined.

In order to compensate for the time delay in the transponded signals 32, the second digital signal is delayed in a FIFO memory or buffer 58 configured as a variable delay line. A digital sample of the second digital signal is written-into the FIFO memory 58 and after some time delay, the digital sample is read-out of the FIFO memory 58. The time delay is determined by the relative timing of write and read commands and is equal to the additional time of flight ($\tau$) after fixed biases such as receiver delay are removed. Thus, the writing-in and reading-out of the digital sample is controlled by write and read control signals transmitted by the timing control microprocessor 42. The second digital signal is then transmitted from the FIFO memory 58 to the multiplier 52.

At this point, both the first and the second digital signals are present at the multiplier 52. If the delay of the second digital signal (e.g., digitized LORAN-C signal 26) was equal to the delay or additional time of flight ($\tau$) of the first digital signal (e.g., digitized transponded signal 32), then the signals would be synchronized. Generally, this is not the case so that the actual additional time of flight must be estimated by the correlation process. Therefore, the estimated additional time of flight ($\tau$) within the correlation detection device 40 must be adjusted to match the additional time of flight of the second digital signal (e.g., transponded signal 32). In order to initiate this process, the first digital signal is multiplied by the second digital signal for providing a first product number. The first product number is then transmitted to an accumulator 60 which includes a reset control which permits the accumulator 60 to be reset for restarting the accumulating process described below.

The first product number generated in the multiplier 52 and transmitted to the accumulator 60 is then stored in the accumulator. Thereafter, the multiplier 52 continues to produce additional product numbers which are also transmitted to and summed within the accumulator 60. Adjustment of the estimated value of the additional time of flight ($\tau$) within the correlation detection device 40 is controlled by the timing control microprocessor 42. These adjustments of the estimated value of ($\tau$) permit the increase or decrease of the sum of the product numbers in the accumulator 60. In order to determine the actual value of ($\tau$), the magnitude of the first digital signal must equal the magnitude of the second digital signal within the multiplier 52. This equivalence between the first and second digital signals occurs when the sum of the product numbers in the accumulator 60 is maximum. Thus, the correct alignment of the first and second digital signals will provide the maximum signal product in the accumulator 60. Therefore, the sum of the product numbers is continued with the objective being to reach the largest product number possible.

Towards this end, ($\tau$) is scanned through the range of reasonable values under the control of the time control microprocessor 42 searching for the correct value of ($\tau$) which will equate the first and second digital signals in the multiplier 52. When the correct value of ($\tau$) is found, the accumulator 52 will contain the largest sum of product numbers. The largest sum of product numbers which is the maximum accumulator number is then recorded in a "largest of" detector 62. The detector 62 then compares the present recorded maximum accumulator number with the previous largest recorded accumulator number. Once the overall largest value of accumulator number is determined and recorded, the associated value of ($\tau$) is recorded and resides in the detector 62.

The output terminal of the detector 62 is connected to the input terminal of the timing control microprocessor 42 to provide an increment/decrement feedback loop. The feedback loop is used to track ($\tau$) and is associated with that feature of the microprocessor 42 which permits the adjustment of the estimated value of ($\tau$) for the increase or decrease of the sum of the product numbers in the accumulator 60. Thus, if the sum of the product numbers in the accumulator 60 is increasing, the adjustment of ($\tau$) is continued in the increasing direction. However, if the sum of the product numbers in the accumulator 60 is decreasing, the adjustment of ($\tau$) is reversed. Once this procedure is completed, the timing control microprocessor 42 located in the master station 12 provides the proper value of the additional time of flight ($\tau$) for the transponded signals 32 which correspond to the directly received LORAN-C signals 26.

In order to activate the microprocessor 42, the 100 KHz filtered and amplified LORAN-C signal 26 is transmitted from the 100 KHz filter/amplifier 54 in the second path to a conventional LORAN-C receiver 64. Upon receiving the filtered and amplified LORAN-C signal 26, the LORAN-C receiver 64 provides a pulse signal to the microprocessor 42 to indicate that the signal 26 has been received. The microprocessor 42 is then activated for processing the received signals 26 but is otherwise in an inactive energy savings mode.

The value of ($\tau$) determined by the above described correlation procedure defines an ellipse which is illustrated by an example described hereinbelow. There is a separate value of ($\tau$) for each LORAN-C transmitter 14, 22, 24 employed. Each of these values of ($\tau$) is transmitted to a second (location) microprocessor (not shown) located in the master station 12. The location microprocessor is employed for mathematically solving for the location of the intersections of two or more ellipses for determining the position of the tracked unit 16. The number of elliptical intersections corresponds to the number of LORAN-C transmitters involved. The values of ($\tau$) in combination with the known positions of the LORAN-C transmitters 14, 22 and 24 and the master station 12 permit the location of the tracked unit 16 to be determined. The mathematical operation of determining the position of the tracked unit 16 is carried out in an elliptical coordinate system. The elliptical coordinates are then translated into the X-Y Cartesian coordinate system by an appropriate set of equations.

Several approaches are available for determining the position of the tracked unit 16. A first approach is an explicit solution which requires knowing each of the values of ($\tau$) as described above. At this point, the location microprocessor contains in memory the values of ($\tau$) and each of the positions of the master station 12 and the transmitters 14, 22 and 24. For each separate value of ($\tau$), the associated transmitter and the master station 12 form the foci on the major axis of a unique ellipse. The classical form of the equation for an ellipse is employed as follows:

$$(x^2/a^2)+(y^2/b^2)=1 \qquad [1]$$

In the case of two transmitters each having a separate value of ($\tau$), two unique ellipses are formed. Equation (1) is utilized twice for providing a first and a second equation, each having two unknowns. Knowing the locations of the first and second transmitters and the first and second values of ($\tau$) which provide the first and second ellipses, first and second equations are provided. The first and second equations are then solved as simultaneous equations for determining the possible positions of the tracked unit 16. The explicit solution results in the greatest number of calculations but provides the highest resolution and accuracy.

A second approach for determining the position of the tracked unit 16 involves successive approximation in which a conventional LORAN-C receiver approximates the initial position of the tracked unit 16 by utilizing the transponded signals 32 received at the master station 12. Further approximations based upon the transponded signals 32 are utilized to interpolate the position of the tracked unit 16.

A third and most preferred approach for determining the position of the tracked unit 16 involves precalculating a look-up table. In the area surrounding and monitored by the master station 12, the LORAN-C transmitters are positioned on an area plot. An X-Y Cartesian type coordinate grid is positioned over the plotted area. The grid includes a plurality of intersections with each intersection representing the position of the tracked unit 16.

Assume that the tracked unit 16 is located on a particular grid intersection "$U_1$". The value of ($\tau$) which represents the additional time of flight of transponded signal 32 as compared to the LORAN-C signal 3526 can be precalculated at intersection "$U_1$" based upon the geometry of the specific ellipse. The additional distance that the transponded signal 32 must travel to reach the master station 12 can be utilized to estimate the corresponding additional time of flight, e.g., the value of ($\tau$). This is possible by realizing that light travels approximately one foot per nanosecond. Thus, the additional distance traveled by the transponded signal 32 from a first transmitter through grid intersection "$U_1$" to the master station 12 can be converted into a first value of ($\tau$) in nanoseconds. Likewise, a second transmitter forms a second ellipse with the master station 12 having a major axis different from the major axis of the first ellipse. Thus, the additional distance traveled by the transponded signal 32 from the second transmitter through grid intersection "$U_1$" to the master station 12 can be converted into a second value of ($\tau$) in nanoseconds.

The first and second values of ($\tau$) form an ordered pair which can be stored in a look-up table memory (not shown) for identifying grid intersection "$U_1$". Next, an ordered pair for identifying a grid intersection "$U_2$" can be precalculated and stored in the look-up table memory as can each of the remaining grid intersections. In determining the position of a tracked unit 16, the first and second values of ($\tau$) corresponding to the first and second transmitters as determined by the correlation detection device 40 are transmitted to the location computer in the master station 12. The location computer determines which grid intersection is closest to the first and second values of ($\tau$) in the stored look-up table. The closest grid intersection is selected with the ordered pair associated with the selected grid intersection being deemed the position of the tracked unit. Greater accuracy can be achieved by known interpolation methods. The preferred look-up table approach provides the advantages of being much quicker since this approach requires fewer real time calculations.

Figure 3:
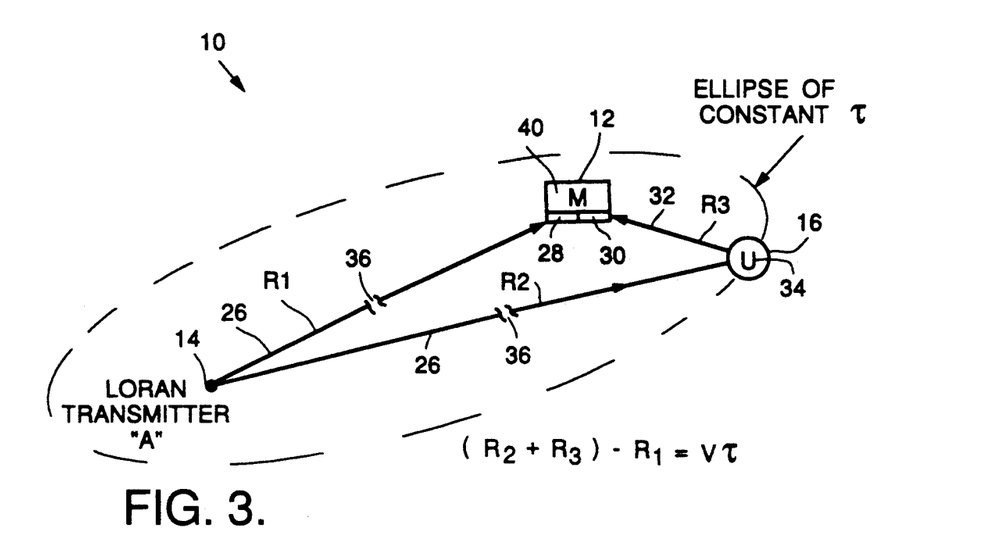
FIG. 3 is a diagram illustrating the procedure for locating a tracked unit in accordance with the accurate location system of FIG. 2 and showing an ellipse of constant $\tau$.

It is known that the locus of points of constant ($\tau$) is an ellipse having foci at the master station 12 and at the transmitter 14, 22 or 24 as shown in FIGS. 3 and 4. Note that if transmitter 14 is at an infinite distance so that the LORAN-C signals are truly plane waves, the locus becomes a parabola. The parabolic locus is sufficiently accurate for actual situations and possibly presents an easier computational task. In two dimensions, the intersection of two ellipses will define the location of the tracked unit 16. In two dimensions, two unknown quantities exist, e.g., the coordinates (x, y) of the tracked unit 16 which, for all practical purposes, can be considered to be stationary. In order to solve for the two unknown quantities, two equations are required. These equations are provided by the intersecting ellipses. The use of three transmitters 14, 22 and 24 permits either resolution of a third dimension or the removal of an unknown transponder delay. The use of a third transmitter also permits removing the ambiguity of two solutions. The intersection of two ellipses, in general, may involve as many as four points of intersection. However, the master station 12 is a focal point of both ellipses and this suffices to create, at most, two points of intersection.

A relationship between the LORAN-C signal paths R1, R2, R3 and $\tau$ is as follows:

$$(R2+R3)-R1 = V\tau \quad [2]$$

The character "V" is symbolic of the velocity of light in distance per unit time and is employed in equation 2 for balancing units since each signal path "R" (e.g., R1, R2, and R3) is representative of a distance and ($\tau$) is measured in units of time. Thus, each side of equation 2 represents units of distance.

Thus, the present invention provides an accurate location system 10 having improved sensitivity, higher precision and the ability to operate in an electrically noisy environment. The high precision is achieved by making the time measurements relative to the master station 12 thereby avoiding the traditional inaccuracies caused by propagation anomalies. Correlation detection of the transponded signals 32 allow optimum use of the energy of the LORAN-C signals 26, 32 for determining when the signals arrive. Since all of the signal energy is utilized during measurement, the accurate location system 10 of the present invention is more efficient than position location systems of the past. Further, tracked units 16, such as emergency vehicles, can be tracked in noisy areas where conventional LORAN is ineffective. Since signal processing is not completed at the tracked unit 16, equipment costs are lower.

An example will serve to illustrate the accurate location system 10 of the present invention. Reference should be made to FIGS. 3 and 4. Suppose that the harbor master in a busy seaport wishes to determine the position of all the ships in the harbor. Assume that the harbor master station is the central master station 12 and that any one of the ships of interest is the tracked unit 16. In this case, the tracked unit is a ship but could also be any piece of equipment having the necessary electronics including but not limited to a vehicle, house, trailer, or even a person. Further, assume that the master station 12 includes a LORAN-C receiver and the tracked ship 16 includes a transponder.

As can be seen in FIG. 3, the delay 36 in the transmission of the LORAN-C signals 26 appears in the first path R1 from the transmitters 14, 22 and 24 to the master station 12 and in the second path R2 from the transmitters to the tracked unit 16. This delay 36 is caused primarily by the weather, ionospheric conditions, terrain and the like. The delay 36 in the two paths is approximately the same and therefore will be eliminated. After receipt, the signals 26 received at the tracked unit 16 are transponded to the harbor master station 12 and then convolved with the LORAN-C signals 26 received at the master station directly from the transmitters. The signals 26 received at the master station directly from the transmitters are received before the transponded signals 32 are received at the master station. By comparing the difference in the time of arrival of the signals 26, 32 received at the master station 12, correlation detection can be used to determine the position of the tracked ship 16.

As a result of the correlation detection, the time difference in arrival of the signals 26, 32 place the tracked ship 16 on the locus of an ellipse where the foci of the ellipse are the transmitter 14 and the harbor master station 12 as shown in FIG. 3. The information concerning the location of the tracked ship on the ellipse is only one dimensional. An additional equation with an additional unknown is necessary to solve for the additional unknown in a two dimensional system. Since the transmitter 14 is one of a complex of transmitters, the process is repeated utilizing either or both of the transmitters 22 and 24 as shown in FIG. 4. As a result, a second or even a third ellipse appearing at an angle to the original ellipse is established. Intersections between the ellipses are employed for determining the position of the tracked ship 16.

If the tracked unit 16 is known to lie on two ellipses, there may be two possible intersection locations 16 and 70 which can define the position of the tracked unit. To select the actual position, several approaches are available. It is helpful if prior knowledge is available of the area in which a tracked unit located at each of the intersections can travel. Reasonableness is another standard available for determining which elliptical intersection, 16 or 70, is the actual position. For example, if the location at intersection 70 was not reasonable, that intersection would be discarded. Such would be the case if a marine unit was being tracked and intersection 70 appeared several miles inland. Further, conventional LORAN-C can be utilized to locate the approximate position of the tracked unit within normal precision sufficient to reject the elliptical intersection which is not the actual position of the tracked unit.

The additional times of flight ($\tau$) for the three ellipses are designated ($\tau$A), ($\tau$B) and ($\tau$C) as shown in FIG. 4. The three ellipses experience more than one intersection point. In order to determine which intersection point is the position of the tracked ship 16, a coarse and fine approach is adopted. Conventional LORAN-C system techniques are utilized in the coarse approach for determining the approximate location of the ship. The coarse approach removes ambiguity by determining which elliptical intersection is to be used in the fine approach. The intersection point, designated "U" in FIG. 4, nearest the tracked ship 16 is generally selected in the coarse approach while the distant intersection point 70, designated "U'" is rejected.

Figure 6:
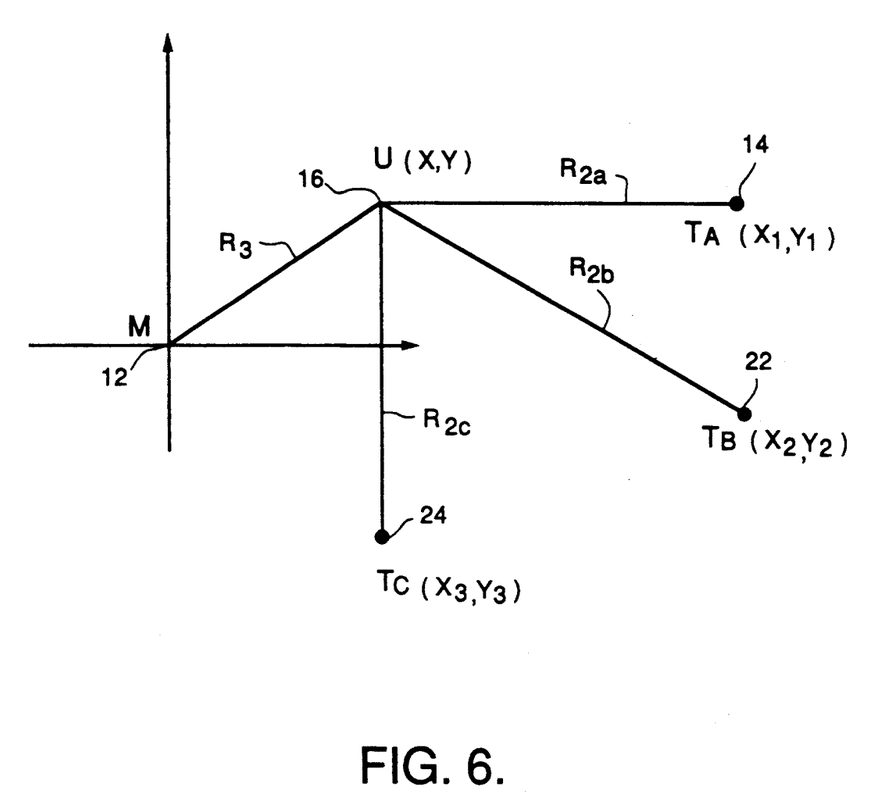
FIG. 6 is a diagram useful in illustrating the mathematical derivation of a set of equations for determining the coordinates of a tracked unit.

The fine adjustment approach is completed at the harbor master station 12 by measuring the time difference of arrival of the direct and transponded signals 26, 32, respectively. With this data, a computer then employs trigonometry for determining the intersection point between the ellipses which defines the position of the tracked ship 16 as shown in FIGS. 4 and 6. Geometric dilution of precision, known as "GDOP", is a standard for measuring the reduction of accuracy of all position location systems. For precise measurements of the location of a tracked unit, the GDOP should be small. In conventional LORAN systems, described by intersecting hyperbolas, the intersections can be at shallow angles. The geometric dilution of precision (GDOP) is influenced by the crossing angle. If the crossing angle is small, for example 10–15 degrees, the GDOP is large reducing the precision of the measurement.

Other navigation systems employ intersecting circles instead of intersecting hyperbolas. Intersecting circles tend to be better behaved, e.g., have a lower measure of geometric dilution of precision (GDOP), than do intersecting hyperbolas. Intersecting ellipses tend to behave like intersecting circles. Thus, the intersections of ellipses have a lower GDOP than the intersections of hyperbolas. If a time position error of, for example, 100' exists, due to a measurement or propagation error, the total position error is equal to the measurement or propagation error multiplied by the GDOP factor. Therefore, the lower the GDOP factor of the intersecting ellipses, the lower the total position error and the more accurate the location system.

A mathematical derivation for providing a set of equations which yields the desired coordinates (x, y) of and resolves ambiguity with respect to the position of the tracked unit 16 is disclosed hereinbelow. In FIG. 6, the master station 12 is shown centered at the origin. The three transmitters 14, 22 and 24 each have coordinates represented by $T(x_i, y_i)$ where i=1, 2, and 3.

Further, the location of the tracked unit 16 is designated by the coordinates U(x, y) and the unique distance "R3" between the tracked unit 16 and the master station 12 is $R3=(x^2+y^2)^{\frac{1}{2}}$. For calculation purposes, it can be assumed that the tracked unit 16 is stationary and that each one of the ellipses is unique. Transposing equation [2] provides $R2+R3=V\tau+R1$. By equating $V\tau+R1=a_i$, equation [2] becomes $R2+R3=a_i$.

For ($1 \leq i \leq 3$), the elliptical condition becomes $$(x^2+y^2)^{\frac{1}{2}} + [(x-x_i)^2+(y-y_i)^2]^{\frac{1}{2}} = a_i. \quad [3]$$

Transposing the term $(x^2+y^2)^{\frac{1}{2}}$ and squaring both sides of equation [4] provides, $$R3=(x^2+y^2)^{\frac{1}{2}}=[a_i^2-(x_i^2+y_i^2)](\tfrac{1}{2}a_i) + (xx_i+yy_i)/a_i \quad [4]$$

The term ($a_i$) is a constant which equals the sum of the distances of the foci "M" (e.g., master station 12) and the transmitters $T_i$ (14, 22, 24) to "U" (the tracked unit 16).

Letting $u_i = [a_i^2-(x_i^2+y_i^2)](\tfrac{1}{2}a)$, three equivalent relationships for R3 are available, which include $$\begin{aligned} R_3 &= u_1 + (1/a_1)(xx_1 + yy_1) & [5a] \\ &= u_2 + (1/a_2)(xx_2 + yy_2) & [5b] \\ &= u_3 + (1/a_3)(xx_3 + yy_3) & [5c] \end{aligned}$$

By equating expressions [5a] and [5b], the equation of a straight line results as follows:

$$x(a_2x_1-a_1x_2)+y(a_2y_1-a_1y_2)=a_1a_2(u_2-u_1) \quad [6]$$

Additionally, by equating expressions [5a] and [5c], a second equation of a straight line results as follows:

$$x(a_3x_1-a_1x_3)+y(a_3y_1-a_1y_3)=a_1a_3(u_3-u_1) \quad [7]$$

Thus, any point (x, y) which satisfies equation [3] for (i=1, 2, 3) must lie on the intersection of the two straight lines given by equations [6] and [7]. Letting $$A_{12}=a_2x_1-a_1x_2 \quad [8a]$$

$$A_{13}=a_3x_1-a_1x_3 \quad [8b]$$

$$B_{12}=a_2y_1-a_1y_2 \quad [8c]$$

$$B_{13}=a_3y_1-a_1y_3 \quad [8d]$$

and solving for (x, y) yields the desired solution for the coordinates U(x,y) of the tracked unit 16 as follows;

$$x=[a_1a_2(u_2-u_1)B_{13}-a_1a_3(u_3-u_1)B_{12}]/(A_{12}B_{13}-A_{13}B_{12}) \quad [9]$$

$$y=[a_1a_3(u_3-u_1)A_{13}-a_1a_2(u_2-u_1)A_{12}]/(A_{12}B_{13}-A_{13}B_{12}) \quad [10]$$

Typical applications of the accurate location system of the present invention include various marine positioning applications as noted in the above recited example. Further, additional applications of such a system include use in an urban environment for location of vehicles. In one situation, the individual vehicles of a fleet of vehicles can be located. Each vehicle 16 would include a LORAN-C receiver/transponder. The LORAN-C signal is received from a LORAN-C transmitter and transponded to the central master station 12. An operator located at the central master station 12 can then locate the position of the vehicle in an electrically noisy environment as described above. A sample fleet might include police vehicles, fire department vehicles, corporate and business vehicles, buses and the like.

Another less common application includes that of locating a private vehicle in an urban environment. Locating a private vehicle would be of significance in an emergency situation. As in the fleet vehicle example, the private vehicle would include a LORAN-C receiver/transmitter for receiving a LORAN-C signal and transponding that signal to the master station 12.

It is within the scope of the accurate location system 10 of the present invention to locate multiple tracked units in a quasi-simultaneous manner. The number of tracked units can be large, for example, fifty. Therefore, in accordance with the previous example, a fleet of fifty ships in the harbor or a fleet of fifty cars in an urban area can each be tracked. A second tracked unit 72 is shown in FIG. 2 for illustration purposes. Under these conditions, the LORAN-C signals 26 are received at the master station 12 from each of the transmitters 14, 22 and 24 as previously described. Further, each of the tracked units 16 and 72 receive signals 26 from the same transmitters. Thereafter, each of the tracked units 16 and 72 transpond signals 32 to the master station 12.

Several methods are available for identifying which tracked unit transponded any of the plurality of signals 32 received at the master station 12 at any particular time. Two such methods or schemes mentioned herein as examples are identified as Frequency Division Multiple Access (FDMA) and Time Division Multiple Access (TDMA). In the Frequency Division Multiple Access scheme, each tracked unit 16 and 72 transponds the signals 32 to the master station 12 at a different frequency. As the transponded signals 32 having different frequencies are received at the master station 12, they are demodulated and then subjected to correlation detection in a sequential manner. Thus, correlation detection is completed sequentially for each of the tracked units 16 and 72 so that an additional time of flight ($\tau$) is determined for each tracked unit and thereafter tagged and stored in a predetermined portion of the computer memory.

In the Time Division Multiple Access scheme, a specified period of time such as, for example, a few minutes is divided into time slots. The length of each time slot is determined by dividing the number of units being tracked into the specified period of time. Thereafter, each tracked unit 16 and 72 is permitted to transpond the signals 32 to the master station 12 during a designated time slot. Each of the transponded signals 32 is at the same frequency but the master station 12 identifies the source of the signals 32 by the time slot during which the transponding occurred. Each of the received signals 32 is then demodulated and subjected to correlation detection as described above for determining the additional time of flight ($\tau$) for each tracked unit 16 and 72.

Those skilled in the art will appreciate that the accurate location system 10 of the present invention is more precise in determining the position of the tracked unit 16 by making time measurements (additional time of flight $\tau$) relative to a local master station 12 thereby improving the sensitivity of the system. Further, the location system 10 avoids the traditional inaccuracies associated with location systems of the past caused by propagation anomalies and permits operation in electrical noisy environments. Additionally, correlation detection of the transponded signals 32 allows for optimum use of all of the energy in the signal. The location system 10 can utilize low cost transponders. Thus, the location system of the present invention is more efficient. Since there is no signal processing completed at the tracked unit, equipment costs are reduced. A key feature of the present invention is that the central master station 12 receives LORAN-C signals directly from the transmitters 14, 22 and 24 and also receives transponded signals 32 from the tracked unit 16. This situation permits determining the position of the tracked unit 16 via correlation detection. Further, the unknown delay in each signal path from the transmitters 14, 22 and 24 to the master station 12 and to the tracked unit 16, respectively (caused by weather and terrain), are canceled.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A position location system for locating the position of a tracked unit comprising:

first and second means for transmitting first and second signals at a first frequency, respectively, said first means and said second means being located remotely from each other;

master means for receiving and storing said first and second signals from said first and second transmitting means, said master means being located remotely from said first and second means for transmitting;

second means for receiving said first and second signals from said first and second transmitting means, said second means being located at said tracked unit, said second receiving means converting said first and second signals to third and fourth signals at a second frequency and transponding said third and fourth signals to said master receiving means, said master receiving means converting said third and fourth signals to said first frequency; and correlation detection means located within said master receiving means for cross-correlating said transponded third and fourth signals with said stored first and second signals for determining the additional times of flight ($\tau$) of said third and fourth signals transponded to said master receiving means wherein the locus of points of constant ($\tau$) form first and second ellipses associated with each of said first and second signals, respectively, with one of a plurality of intersections of said ellipses defining the position of said tracked unit.

2. The position location system of claim 1 wherein said first and second transmitting means comprises a first LORAN-C transmitter and a second LORAN-C transmitter.

3. The position location system of claim 1 wherein said first and second signals transmitted first and second transmitting means are LORAN-C signals.

4. The position location system of claim 1 wherein said master receiving means comprises a first LORAN-C receiver for directly receiving said first and second signals.

5. The position location system of claim 4 wherein said master receiving means comprises a second LORAN-C receiver for receiving said third and fourth signals.

6. The position location system of claim 1 wherein said third and fourth signals transponded by said second receiving means are LORAN-C signals.

7. The position location system of claim 1 wherein said correlation detection means comprises a microprocessor for cross-correlating said transponded third and fourth signals with said stored first and second signals.

8. A method for accurately locating a tracked unit, said method comprising the steps of:

propagating first and second signals from at least a first and a second transmitter to a master station and to a tracked unit, respectively;

receiving and storing said first and second signals at said master station;

receiving said first and second signals at said tracked unit;

operating on said first and second signals at said tracked unit for providing correspondings third and fourth signals respectively;

transponding said third and fourth signals to said master station for correlation detection with said stored first and second signals;

cross-correlating said third and fourth signals with said stored first and second signals for determining the additional times of flight ($\tau$) of said third and fourth signals transponded to said master station; and forming an ellipse associated with each of said first and second signals based upon the locus of points of constant ($\tau$) wherein one of a plurality of intersections of said ellipses defines the position of said tracked unit.

9. The method of claim 8 wherein said propagation of said first and second signals defines a first path from said transmitters to said master station and a second path from said transmitters to said tracked unit, each of said first and second paths including an unknown delay and wherein each said unknown delay being canceled during said step of cross-correlating said third and fourth signals with said stored first and second signals.

10. The method of claim 13 further including the step of adjusting the data in a coarse manner for determining which of said plurality of intersections is selected for the step of cross-correlating said third and fourth signals with said stored first and second signals.

11. The method of claim 13 further including the step of adjusting the data in a fine manner for measuring the additional times of flight ($\tau$) for the third and fourth signals to reach said master station.

* * * * *